US012401943B2

(12) United States Patent
Tu et al.

(10) Patent No.: US 12,401,943 B2
(45) Date of Patent: Aug. 26, 2025

(54) COMPUTER SYSTEM AND OUTPUT ADJUSTING METHOD USED FOR AUDIO OUTPUT APPARATUS

(71) Applicant: Acer Incorporated, New Taipei (TW)

(72) Inventors: Po-Jen Tu, New Taipei (TW); Ruey-Ching Shyu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 234 days.

(21) Appl. No.: 18/186,969

(22) Filed: Mar. 21, 2023

(65) Prior Publication Data

US 2024/0163605 A1 May 16, 2024

(30) Foreign Application Priority Data

Nov. 15, 2022 (TW) .................................. 111143630

(51) Int. Cl.
*H04R 29/00* (2006.01)
*H04R 3/00* (2006.01)

(52) U.S. Cl.
CPC ............ *H04R 3/00* (2013.01); *H04R 29/001* (2013.01); *H04R 2430/01* (2013.01)

(58) Field of Classification Search
CPC .... H04R 29/008; H04R 29/004; H04R 29/00; H04R 29/001; H04R 2430/01
USPC ............................... 381/56, 58–59, 104–109
See application file for complete search history.

(56) References Cited

U.S. PATENT DOCUMENTS

| | | | | |
|---|---|---|---|---|
| 9,813,792 | B2 * | 11/2017 | Neumeyer | H04R 1/1091 |
| 11,234,077 | B2 * | 1/2022 | Felton | H04R 3/04 |

FOREIGN PATENT DOCUMENTS

| | | |
|---|---|---|
| CN | 101051823 | 10/2007 |
| TW | 201242384 | 10/2012 |

* cited by examiner

*Primary Examiner* — Disler Paul
(74) *Attorney, Agent, or Firm* — JCIPRNET

(57) ABSTRACT

A computer system and an output adjusting method used for an audio output apparatus are provided. In the method, detecting the output power of the audio output apparatus while outputting the audio signal, counting the accumulated time of the audio output apparatus while the output power is greater than the reference power, determining whether the accumulated time meets a corresponding adjusting condition, and adjusting the current maximum output power into the target power gradually within the time range according to the determined result that the accumulated time meets the corresponding adjusting condition. The adjusting condition includes that the accumulated time is greater than or equal to the tolerated hearing time of the corresponding reference power. The target power is less than or equal to the reference power which meets the adjusting condition. The maximum output power is the upper limit of the output power of the audio output apparatus.

14 Claims, 3 Drawing Sheets

COMPUTER SYSTEM AND OUTPUT ADJUSTING METHOD USED FOR AUDIO OUTPUT APPARATUS

CROSS-REFERENCE TO RELATED APPLICATION

This application claims the priority benefit of Taiwan application serial no. 111143630, filed on Nov. 15, 2022. The entirety of the above-mentioned patent application is hereby incorporated by reference herein and made a part of this specification.

BACKGROUND

Technical Field

The disclosure relates to an audio output control technology, and in particular relates to a computer system and an output adjusting method used for an audio out apparatus.

Description of Related Art

Many people enjoy playing music through their mobile devices. Some mobile device users prefer to listen to music through headphones. However, prolonged use of headphones may cause hearing damage. According to the research of the World Health Organization (WHO), if people are in a high-noise environment for prolonged periods of time, the human auditory system has acceptance degree at different times for noises of different power. For example, you may be in an environment with noise greater than 85 decibels (dB) for up to 8 hours a day, you may be in an environment with noise greater than 91 dB for up to 2 hours a day, or you may be in an environment with noise greater than 120 dB for up to 9 seconds a day.

Most of the existing mobile devices limit the maximum output power of the headphones to a certain fixed value (e.g., 100 dB) in order to meet the EU En50332 specification. Alternatively, some operating systems allow users to select the maximum output power. However, hearing damage may still occur if the headphones are played at or near the maximum output power for prolonged periods of time.

SUMMARY

In view of this, the embodiments of the disclosure provide a computer system and an output adjusting method for an audio output apparatus, which may adaptively adjust the maximum output power to reduce the chance of auditory system damage.

The output adjusting method of the embodiment of the disclosure is suitable for adjusting the output power of the audio output apparatus. The output adjusting method includes (but not limited to) the following operation. Output power of the audio output apparatus is detected while outputting audio signal. Accumulated time of the audio output apparatus is counted while the output power is greater than the one or more reference power. Whether the accumulated time meets a corresponding adjusting condition is determined. The adjusting condition includes that the accumulated time is greater than or equal to tolerated hearing time of the corresponding reference power, and the tolerated hearing time is defined according to the acceptance degree of human hearing. Current maximum output power of the audio output apparatus is adjusted into target power gradually within a time range according to a determined result that the accumulated time meets the corresponding adjusting condition. The time range is less than or equal to a first time difference between hearing critical time corresponding to the reference power and the accumulated time. The target power is less than or equal to the reference power that meets the adjusting condition. The maximum output power is an upper limit of the output power of the audio output apparatus. The hearing critical time is greater than or equal to the tolerable hearing time.

The computer system of the embodiment of the disclosure includes (but not limited to) an audio output apparatus, a memory, and a processor. The audio output apparatus outputs an audio signal. The memory is used to store program code. The processor is coupled to the audio output apparatus and the memory. The processor is configured to load and execute the program code to execute the following operation. Output power of the audio output apparatus is detected while outputting audio signal. Accumulated time of the audio output apparatus is counted while the output power is greater than the one or more reference power. Whether the accumulated time meets a corresponding adjusting condition is determined. Current maximum output power of the audio output apparatus is adjusted into target power gradually within a time range according to a determined result that the accumulated time meets the corresponding adjusting condition. The adjusting condition includes that the accumulated time is greater than or equal to tolerated hearing time of the corresponding reference power, and the tolerated hearing time is defined according to the acceptance degree of human hearing. The time range is less than or equal to a first time difference between hearing critical time corresponding to the reference power and the accumulated time. The target power is less than or equal to the reference power that meets the adjusting condition. The maximum output power is an upper limit of the output power of the audio output apparatus. The hearing critical time is greater than or equal to the tolerable hearing time.

Based on the above, according to the computer system and the output adjusting method for the audio output apparatus according to the embodiment of the disclosure, the accumulated time while the output power is greater than each reference power is counted, the target power is determined according to the comparison result between the accumulated time and the tolerable hearing time, and the current maximum output power is gradually adjusted. In this way, the maximum volume may be dynamically adjusted to meet the acceptance degree of the auditory system. In addition, the maximum output power may be adjusted gradually without affecting user experience.

In order to make the above-mentioned features and advantages of the disclosure comprehensible, embodiments accompanied with drawings are described in detail below.

DETAILED DESCRIPTION OF DISCLOSED EMBODIMENTS

Figure 1:
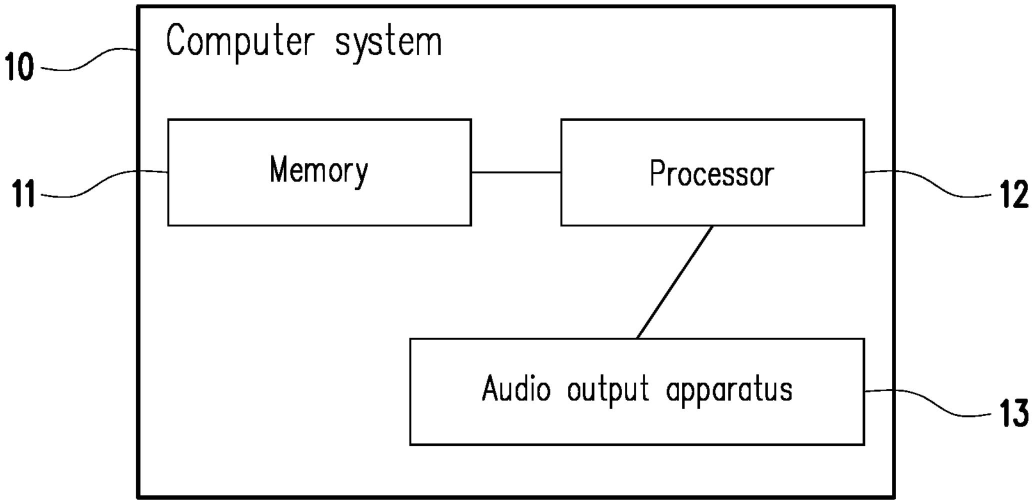
FIG. 1 is an element block diagram of a computer system according to an embodiment of the disclosure.

FIG. 1 is an element block diagram of a computer system 10 according to an embodiment of the disclosure. Referring to FIG. 1, the computer system 10 includes (but not limited to) a memory 11, a processor 12, and an audio output apparatus 13. The computer system 10 may be one or more desktop computers, notebook computers, smart phones, tablet computers, servers, or other electronic devices.

The memory 11 may be any type of fixed or movable random access memory (RAM), read only memory (ROM), flash memory, conventional hard disk drive (HDD), solid-state drive (SSD) or similar components. In one embodiment, the memory 11 is used to store program codes, software modules, configurations, data, or files (e.g., accumulated time, reference power, maximum output power and/or time difference).

The processor 12 is coupled to the memory 11. The processor 12 may be a central processing unit (CPU), a graphics processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar components, or combinations of components thereof. In one embodiment, the processor 12 is used to execute all or some of the operations of the computer system 10, and may load and execute various program codes, software modules, files, and data stored in the memory 11. In some embodiments, some operations in the method of the embodiments of the disclosure may be implemented by different or the same processor 12.

The audio output apparatus 13 is coupled to the processor 12. The audio output apparatus 13 may be a speaker, a loudspeaker, or headphones. In one embodiment, the audio output apparatus 13 is built in the body of the computer system 10. In another embodiment, the audio output apparatus 13 is not built into the body of the computer system 10. For example, the audio output apparatus 13 is an external speaker for a desktop computer or Bluetooth headphones. In one embodiment, the audio output apparatus 13 is used for playing audio signals.

Hereinafter, the method according to the embodiment of the disclosure is described in conjunction with various apparatuses, components, and modules in the computer system 10. Each process of the method may be adjusted according to the implementation, and is not limited to thereto.

Figure 2:
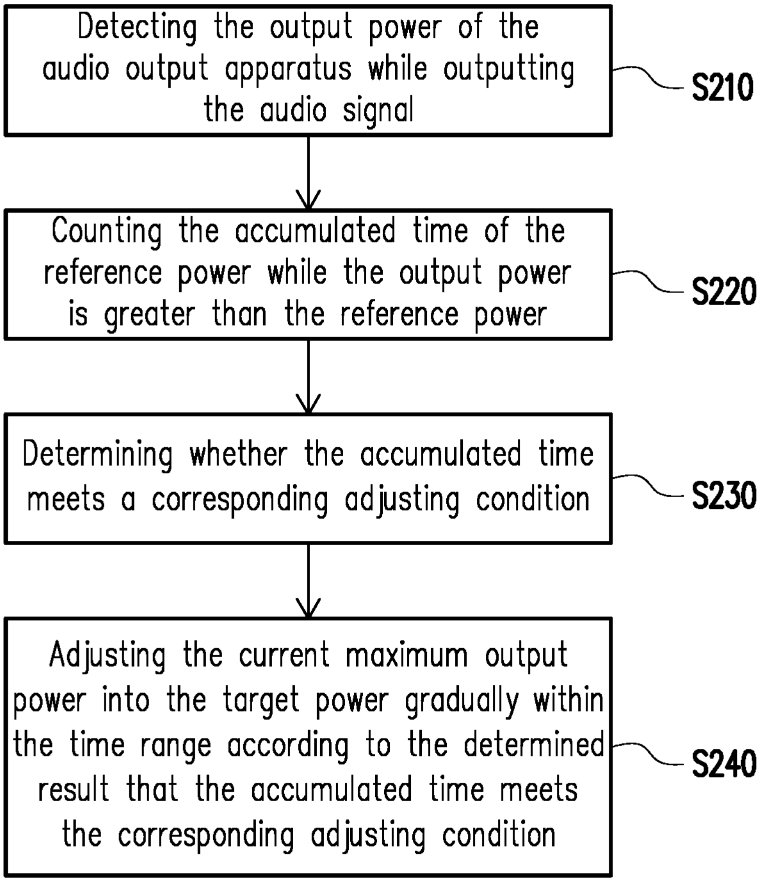
FIG. 2 is a flowchart of an output adjusting method according to an embodiment of the disclosure.

FIG. 2 is a flowchart of an output adjusting method according to an embodiment of the disclosure. Referring to FIG. 2, the processor 12 detects the output power of the audio output apparatus 13 while outputting audio signal (step S210). Specifically, the output power of the audio output apparatus 13 may be reflected in the volume. The higher the output power, the higher the volume. The lower the output power, the lower the volume. In one embodiment, the processor 12 may obtain the operating system running on the computer system 10, the microprocessor, or the volume or scale gain settings of the audio signal-related circuits in the computer system 10, which serve as reference for the output power. The processor 12 may convert the volume or scale gain into the corresponding output power through a look-up table, a formula conversion, or other means. In another embodiment, the processor 12 may obtain the current characteristic (e.g., voltage or current) that drives the audio output device 13 and/or the control signal related to the volume level, which serve as a reference for the output power. Similarly, the processor 12 may convert the current characteristic or the control signal into the corresponding output power through a look-up table, a formula conversion, or other means. In one embodiment, the processor 12 may receive audio through a microphone (not shown), and measure the amplitude or power of the audio signal obtained according to the received audio. The processor 12 may further convert the measured amplitude or power into a corresponding output power through a look-up table, a formula conversion, or other means.

It should be noted that the output characteristics (e.g., appearance, type, amplification power, or environment) of different audio output apparatuses 13 may be perceived differently from actual volumes with the same audio setting by the listener. In some embodiments, the processor 12 may compensate the output power according to the type and/or environment of the audio output apparatus 13 to meet the actual volume.

In one embodiment, the processor 13 may detect the output power according to a fixed or dynamically changing sampling frequency. For example, the sampling frequency is 10 times per minute. For another example, the sampling frequency is 6 times in odd-numbered minutes and 3 times in even-numbered minutes. In one embodiment, the output power detected at different time points may be recorded in a log for subsequent use.

The processor 12 counts the accumulated time of the audio output apparatus 13 while the output power is greater than one or more reference power (step S220). Specifically, the reference power, taking audio scale/energy as an example, may be 85, 88, 91 and/or 100 decibels (dB). The processor 12 may define a reference power and a corresponding tolerable hearing time according to human hearing acceptance degree. For example, Table (1) is the corresponding acceptance degree of the human auditory system to noises of different powers provided by the Centers for Disease Control (CDC):

TABLE 1

| Hearing critical time per day | Audio scale (dB) |
|---|---|
| 25 hours | 80 |
| 8 hours | 85 |
| 2 hours and 30 minutes | 90 |
| 47 minutes | 95 |
| 15 minutes | 100 |
| 4 minutes | 105 |
| 1 minute and 30 seconds | 110 |
| 28 seconds | 115 |
| 9 seconds | 120 |

If one listens to the audio of 120 decibels for more than 9 seconds, it may cause hearing damage, and so on. The reference power may be all or a portion of the audio scale in Table (1). The tolerable hearing time may be equal to or less than the hearing critical time. That is, the hearing critical time may be greater than or equal to the tolerable hearing time. For example, Table (2) is an example describing the corresponding relationship between hearing critical time and tolerable hearing time:

TABLE 2

| Hearing critical time | Tolerable hearing time (minute) |
|---|---|
| 8 hours | 320 |
| 2 hours and 30 minutes | 100 |
| 47 minutes | 30 |
| 15 minutes | 10 |

It should be noted that the value of the reference power and its corresponding tolerable hearing time may still be changed according to actual requirements, and is not limited by the embodiment of the disclosure.

The processor 12 may count the accumulated time of the audio output apparatus 13 while the output power is greater than each reference power within the statistical period (e.g., 1440 minutes, 480 minutes) after each time instance. Alternatively, the processor 12 may count the accumulated time in the day or in a specific hearing period (e.g., from 8 am to 10 pm or from 6 am to 6 pm). For example, if the instantaneous output power is 92 decibels, the processor 12 accumulates the time when the reference power is 80, 85 and 90 decibels.

Figure 3:
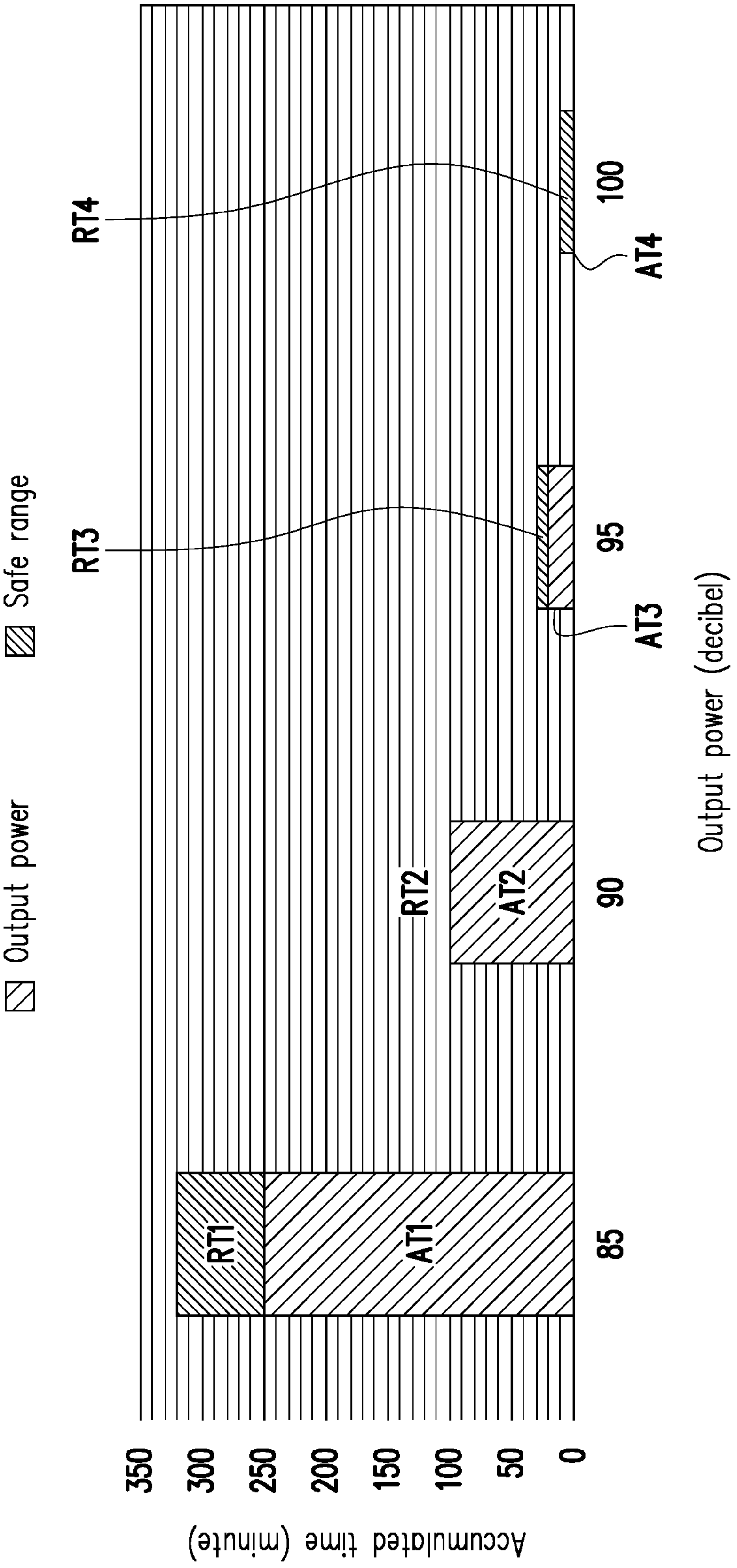
FIG. 3 is a schematic diagram of time statistic results according to an embodiment of the disclosure.

The time statistic results of multiple reference powers are shown in FIG. 3 as an example. FIG. 3 is a schematic diagram of time statistic results according to an embodiment of the disclosure. Referring to FIG. 3, the accumulated time AT1 with a reference power of 85 dB is 250 minutes, the accumulated time AT2 with a reference power of 90 dB is 100 minutes, the accumulated time AT3 with a reference power of 95 dB is 20 minutes, and the accumulated time AT4 with a reference power of 100 dB is 0.

The processor 12 determines whether the accumulated time meets the corresponding adjusting condition (step S230). Specifically, the adjusting condition includes that the accumulated time is greater than or equal to the tolerable hearing time corresponding to one or more reference power. That is, the accumulated time has approached, equaled, or exceeded the hearing critical time.

In one embodiment, the processor 12 may obtain a time difference between the accumulated time and the corresponding tolerable hearing time, and the time difference is obtained by subtracting the accumulated time from the corresponding tolerable hearing time. The time difference may serve as a safe range. Taking FIG. 3, Table (1), and Table (2) as an example, the safe range RT1 with a reference power of 85 decibels is 70 minutes (320 minutes—the accumulated time AT1), the safe range RT2 with a reference power of 90 decibels is 0 (100—the accumulated time AT2), the safe range RT3 with a reference power of 95 dB is 10 minutes (30—the accumulated time AT3), and the safe range RT4 with a reference power of 100 dB is 10 minutes (10—the accumulated time AT4).

The processor 12 may determine whether the time difference (i.e., the safe range) is equal or less than zero. In response to the time difference being equal to or less than zero, the processor 12 may determine that the accumulated time meets the corresponding adjusting condition. In response to a second time difference being greater than zero, the processor 12 may determine that the accumulated time does not meet the corresponding adjusting condition.

In another embodiment, the processor 12 may directly compare whether the accumulated time of each reference power is greater than the corresponding tolerable hearing time. In response to the accumulated time of one or more reference power being greater than the corresponding tolerable hearing time, the processor 12 may determine that the accumulated time meets the corresponding adjusting condition. In response to the accumulated time of the reference power being less than or equal to the corresponding tolerable hearing time, the processor 12 may determine that the accumulated time does not meet the corresponding adjusting condition.

The processor 12 adjusts the current maximum output power of the audio output apparatus 13 into the target power gradually within a time range according to a determined result that the accumulated time meets the corresponding adjusting condition (step S240). Specifically, if it is determined that the accumulated time meets the adjusting condition, the auditory system may be damaged soon. The processor 12 may set the target power according to the reference power that meets the condition. The target power is less than or equal to the reference power meeting the adjusting condition, so that the subsequent output power does not exceed the reference power meeting the adjusting condition. For example, if the reference power meeting the adjusting condition is 90 decibels, the target power may be 85 decibels. If the subsequent output power does not exceed the reference power meeting the adjusting conditions, the accumulated time of the reference power may be maintained or decreased, thereby avoiding auditory system damage.

In addition, the maximum output power is the upper limit of the output power of the audio output apparatus 13. In one embodiment, the processor 12 may set the operating system running on the computer system 10, the microprocessor, or the configuration related to the maximum output power of the audio signal-related circuits in the computer system 10. For example, the iOS system provides a volume limit for music.

In an embodiment, multiple reference power include a first reference power and a second reference power. The second reference power is less than the first reference power. In response to the fact that the output power of the audio output device 13 being greater than the accumulated times of the first reference power and the second reference power meet both the corresponding adjusting conditions, the processor 12 may set the target power to be less than or equal to the second reference power. That is, the processor 12 selects the minimum of those reference powers meeting the adjusting conditions as the basis for setting the target power. For example, if the reference power meeting the adjusting condition are 90 and 85 decibels, then the target power may be 80 decibels. Therefore, the target power is not greater than any reference power that meets the adjusting conditions.

In addition, the embodiment of the disclosure adopts gradual power conversion, which is difficult for users to perceive the power change to avoid affecting the hearing experience. The processor 12 may gradually adjust the current output power to the target power within a time range. "Gradual" or "gradually" means that the current maximum output power gradually changes with time. The time range is less than or equal to the time difference between the hearing critical time corresponding to the reference power meeting the adjusting condition and the accumulated time. That is, before the hearing critical time is reached or the hearing is damaged, the adjustment of the maximum output power is completed. Taking FIG. 3, Table (1), and Table (2) as an example, the processor 12 may complete the adjustment of the maximum output power within 40 minutes (less than 50 minutes (2 hours and 30 minutes-100 minutes)).

Figure 4:
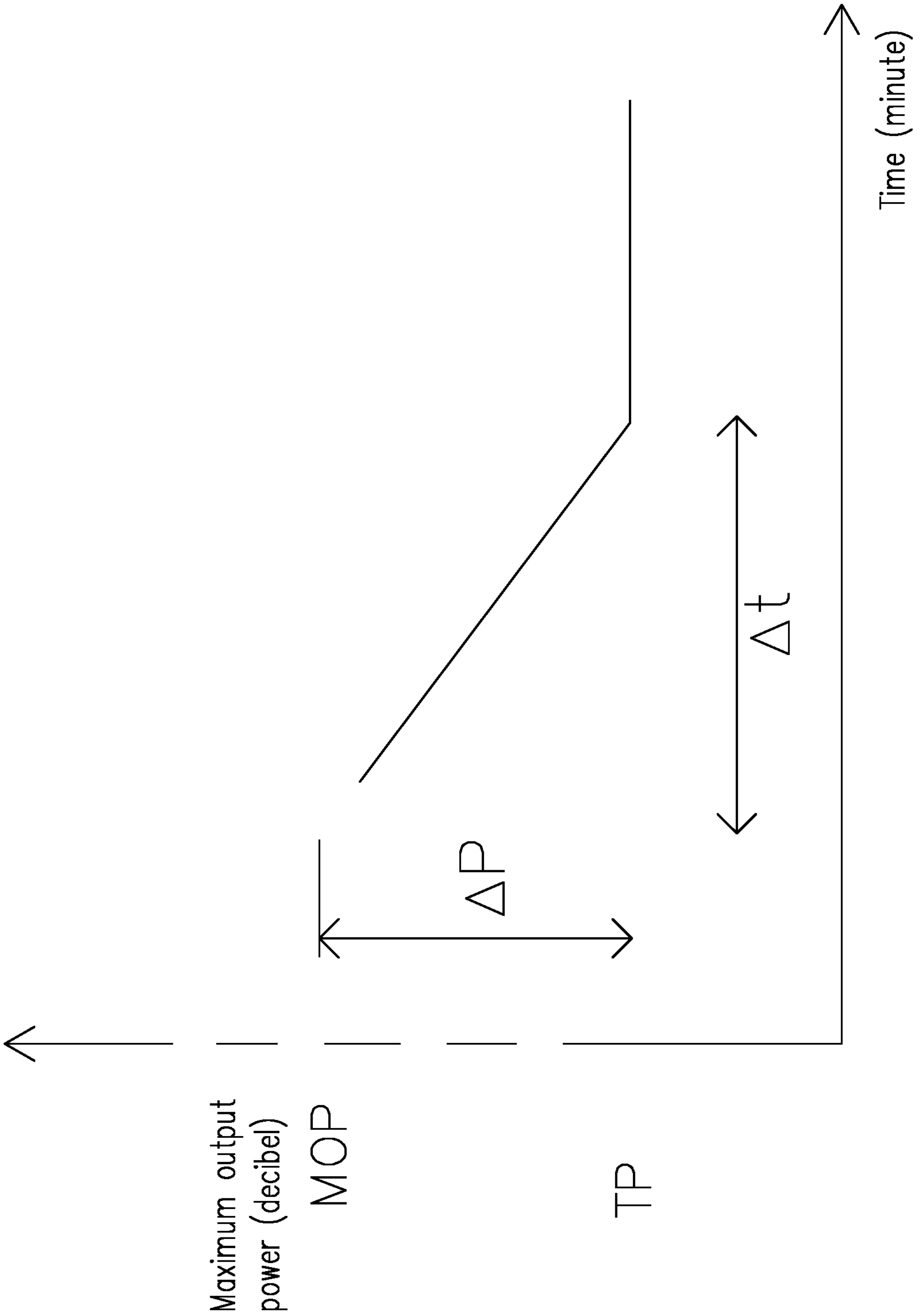
FIG. 4 is a power versus time diagram according to an embodiment of the disclosure that is gradually adjusted.

In an embodiment, the power change of the maximum output power per unit time within the time range is the same. The unit time is, for example, 1 minute, 10 seconds, or 1 second. For example, FIG. 4 is a power versus time diagram according to an embodiment of the disclosure that is gradually adjusted. Referring to FIG. 4, the power difference ΔP is the difference (15 dB) between the current maximum output power MOP (105 dB) and the target power TP (90 dB). The time range Δt is 45 minutes. Taking a fixed slope (power change/time) as an example, the processor 12 may set the slope by selecting a time range corresponding to a certain reference power (e.g., the hearing critical time of 100 decibels minus the tolerable hearing time: 15−10=5 minutes) and the difference (5 dB) of each reference power, in which the slope is ±1 dB/min. It should be noted that the power change is not limited to the linear change shown in FIG. 4, and the waveform of the power change may also be a parabolic or an irregular curve, which is not limited.

In addition to decreasing the maximum output power, embodiments of the disclosure may also increase the maximum output power. In an embodiment, the multiple reference power further includes a third reference power, and the third reference power is greater than the aforementioned second reference power and the current maximum output power. It is assumed that the maximum output power has been decreased to a specific target power lower than the third reference power beforehand. If the statistical time is a specific period before the current time point, the accumulated time of the third reference power may decrease. In response to the fact that the output power of the audio output device 13 being greater than the accumulated time of the third reference power meets the corresponding adjusting condition, the processor 12 may set the target power to be less than or equal to the third reference power. The adjusting condition includes that the accumulated time is less than the returned accumulated time corresponding to the third reference power. The returned accumulated time is, for example, zero, 5 minutes, or 10 minutes. In some embodiments, the adjusting condition also includes a buffer interval (e.g., 1 hour, 4 hours, or 8 hours) after the previous adjustment of the maximum output power, so as to avoid affecting the hearing experience due to frequent adjustment of the maximum output power.

To sum up, in the computer system and the output adjusting method for the audio output apparatus of the embodiment of the disclosure, each reference power and the corresponding tolerable hearing time are defined, the accumulated time when the output power is greater than each reference power is counted, the target power is determined, and the maximum output power is gradually adjusted into the target power within the time range. Therefore, the embodiment of the disclosure may reduce the risk of hearing damage, and the power adjustment does not affect the hearing experience.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An output adjusting method, suitable for adjusting output power of an audio output apparatus, the output adjusting method comprising:

detecting the output power of the audio output apparatus while outputting an audio signal;

counting accumulated time of the audio output apparatus while the output power is greater than at least one reference power;

determining whether the accumulated time meets a corresponding adjusting condition, wherein the adjusting condition comprises that the accumulated time is greater than or equal to tolerated hearing time of the at least one reference power, the tolerated hearing time is defined according to acceptance degree of human hearing, and determining whether the accumulated time meets the corresponding adjusting condition comprises:

obtaining a second time difference between the accumulated time and a corresponding tolerable hearing time, wherein the second time difference is obtained by subtracting the accumulated time from the corresponding tolerable hearing time; and determining whether the second time difference is equal to or less than zero; and adjusting current maximum output power of the audio output apparatus into target power gradually within a time range according to a determined result that the accumulated time meets the corresponding adjusting condition, wherein the time range is less than or equal to a first time difference between hearing critical time corresponding to the at least one reference power and the accumulated time, the target power is less than or equal to one of the reference power that meets the adjusting condition, a maximum output power is an upper limit of the output power of the audio output apparatus, and the hearing critical time is greater than or equal to the tolerable hearing time.

2. The output adjusting method according to claim 1, further comprising:

in response to the second time difference being equal to or less than zero, determining that the accumulated time meets the corresponding adjusting condition.

3. The output adjusting method according to claim 1, further comprising:

in response to the second time difference being greater than zero, determining that the accumulated time does not meet the corresponding adjusting condition.

4. The output adjusting method according to claim 1, wherein determining whether the accumulated time meets the corresponding adjusting condition comprises:

in response to the accumulated time of the at least one reference power being greater than the corresponding tolerable hearing time, determining that the accumulated time meets the corresponding adjusting condition; and in response to the accumulated time of the at least one reference power being less than or equal to the corresponding tolerable hearing time, determining that the accumulated time does not meet the corresponding adjusting condition.

5. The output adjusting method according to claim 1, wherein the at least one reference power comprises a first reference power and a second reference power, the second reference power is less than the first reference power, and the output adjusting method comprises:

in response to the output power of the audio output device being greater than the first reference power and the accumulated time of the second reference power meeting the corresponding adjusting condition, setting the target power to be less than or equal to the second reference power.

6. The output adjusting method according to claim 5, wherein the at least one reference power further comprises a third reference power, the third reference power is greater than the second reference power and the current maximum output power, and the output adjusting method further comprises:

in response to the output power of the audio output device being greater than the accumulated time of the third reference power meeting the corresponding adjusting condition, setting the target power to be less than or equal to the third reference power, wherein the adjusting condition comprises that the accumulated time is less than a returned accumulated time corresponding to the third reference power.

7. The output adjusting method according to claim 1, wherein a power change of the maximum output power per unit time within the time range is the same.

8. A computer system, comprising:

an audio output apparatus, used to output an audio signal;

a memory, used to store program code; and a processor, coupled to the audio output apparatus and the memory and configured to load and execute the program code to execute:

detecting the output power of the audio output apparatus while outputting the audio signal;

counting accumulated time of the audio output apparatus while the output power is greater than at least one reference power;

determining whether the accumulated time meets a corresponding adjusting condition, wherein the adjusting condition comprises that the accumulated time is greater than or equal to tolerated hearing time of the at least one reference power, the tolerated hearing time is defined according to acceptance degree of human hearing, and the processor is further configured to:

obtain a second time difference between the accumulated time and a corresponding tolerable hearing time, wherein the second time difference is obtained by subtracting the accumulated time from the corresponding tolerable hearing time; and determine whether the second time difference is equal to or less than zero; and adjusting current maximum output power of the audio output apparatus into target power gradually within a time range according to a determined result that the accumulated time meets the corresponding adjusting condition, wherein the time range is less than or equal to a first time difference between hearing critical time corresponding to the at least one reference power and the accumulated time, the target power is less than or equal to one of the reference power that meets the adjusting condition, a maximum output power is an upper limit of the output power of the audio output apparatus, and the hearing critical time is greater than or equal to the tolerable hearing time.

9. The computer system according to claim 8, wherein the processor is further configured to:

in response to the second time difference being equal to or less than zero, determine that the accumulated time meets the corresponding adjusting condition.

10. The computer system according to claim 8, wherein the processor is further configured to:

in response to the second time difference being greater than zero, determine that the accumulated time does not meet the corresponding adjusting condition.

11. The computer system according to claim 8, wherein the processor is further configured to:

in response to the accumulated time of the at least one reference power being greater than the corresponding tolerable hearing time, determine that the accumulated time meets the corresponding adjusting condition; and in response to the accumulated time of the at least one reference power being less than or equal to the corresponding tolerable hearing time, determine that the accumulated time does not meet the corresponding adjusting condition.

12. The computer system according to claim 8, wherein the at least one reference power comprises a first reference power and a second reference power, the second reference power is less than the first reference power, and the processor is further configured to:

in response to the output power of the audio output device being greater than the first reference power and the accumulated time of the second reference power meeting the corresponding adjusting condition, set the target power to be less than or equal to the second reference power.

13. The computer system according to claim 12, wherein the at least one reference power further comprises a third reference power, the third reference power is greater than the second reference power and the current maximum output power, and the processor is further configured to:

in response to the output power of the audio output device being greater than the accumulated time of the third reference power meeting the corresponding adjusting condition, set the target power to be less than or equal to the third reference power, wherein the adjusting condition comprises that the accumulated time is less than a returned accumulated time corresponding to the third reference power.

14. The computer system according to claim 8, wherein a power change of the maximum output power per unit time within the time range is the same.

* * * * *